US009438155B2

United States Patent
Cao et al.

(10) Patent No.: US 9,438,155 B2
(45) Date of Patent: Sep. 6, 2016

(54) PERMANENT MAGNET GENERATOR INDUCTANCE PROFILE IDENTIFICATION

(71) Applicant: Vestas Wind Systems A/S, Aarhus N (DK)

(72) Inventors: Shu Yu Cao, Singapore (SG); Anshuman Tripathi, Singapore (SG); Swee Yee Fonn, Singapore (SG); Ramasamy Anbarasu, Lubeck (DE); Amit Kumar Gupta, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 638 days.

(21) Appl. No.: 13/729,705

(22) Filed: Dec. 28, 2012

(65) Prior Publication Data

US 2013/0265013 A1 Oct. 10, 2013

Related U.S. Application Data (63) Continuation of application No. PCT/DK2011/050241, filed on Jun. 27, 2011.

(60) Provisional application No. 61/359,629, filed on Jun. 29, 2010.

(30) Foreign Application Priority Data

Jun. 29, 2010 (DK) ................................ 2010 70320

(51) Int. Cl.
| | |
|---|---|
| *H02P 9/02* | (2006.01) |
| *H02P 27/02* | (2016.01) |
| *H02P 21/12* | (2016.01) |
| *H02P 21/14* | (2016.01) |
| *H02P 25/28* | (2006.01) |
| *H02P 25/30* | (2006.01) |

(52) U.S. Cl.
CPC ................ *H02P 9/02* (2013.01); *H02P 21/12* (2013.01); *H02P 21/141* (2013.01); *H02P 27/02* (2013.01); *H02P 25/28* (2013.01); *H02P 25/30* (2013.01)

(58) Field of Classification Search
CPC ............ H02P 9/10; H02P 9/32; H02P 9/302; H02P 9/305; H02P 9/42; H02P 9/004; H02P 9/40; H02P 25/22; H02P 25/24; H02P 25/28; H02P 25/30
USPC ........................................................ 702/182
See application file for complete search history.

(56) References Cited

U.S. PATENT DOCUMENTS

| | | |
|---|---|---|
| 6,803,773 B1 | 10/2004 | Cyran et al. |
| 2002/0047683 A1 | 4/2002 | Kawashima |
| 2008/0129243 A1 | 6/2008 | Nashiki |
| 2009/0157336 A1 | 6/2009 | Chen |

FOREIGN PATENT DOCUMENTS

| | | |
|---|---|---|
| GB | 2341690 A | 3/2000 |
| WO | 2012000507 A1 | 1/2012 |

OTHER PUBLICATIONS

Danish Patent and Trademark Office Search Report dated Jun. 14, 2011 for DK application No. PA 2010 70300.
PCT International Search Report dated Oct. 10, 2011 for International Application No. PCT/DK2011/050241, 3 pages.
Li et al. "Improved Rotor Position Estimation by Signal Injection in Brushless AC Motors, Accounting for Cross-Coupling Magnetic Saturation" 42nd IAS Annual Meeting Industry Applications Conference, Sep. 2007, pp. 2357-2364.

*Primary Examiner* — Toan Le
*Assistant Examiner* — Lynda Dinh
(74) *Attorney, Agent, or Firm* — Patterson + Sheridan, LLP (57) ABSTRACT

Parameters of PM machines, especially for IPM machine, are known to vary by significant amounts. This affects the controllability of such machines, which may lead to reduced power loading capability and increased losses. The present invention relates to a method for PM machine inductance profile identification based on voltage mode stator flux observation which could be easily integrated to the generator start-up process in wind turbine application for both stator flux vector feedback control system and current vector feedback control system.

14 Claims, 12 Drawing Sheets

PERMANENT MAGNET GENERATOR INDUCTANCE PROFILE IDENTIFICATION

CROSS-REFERENCE TO RELATED APPLICATIONS

This application is a continuation of co-pending PCT patent application No. PCT/DK2011/050241, filed Jun. 27, 2011, which claims the benefit of Danish patent application serial number PA 2010 70300, filed Jun. 29, 2010 and U.S. provisional patent application Ser. No. 61/359,629, filed Jun. 29, 2010. Each of the aforementioned related patent applications is herein incorporated by reference in its entirety.

FIELD OF THE INVENTION

This present invention relates to a permanent magnet (PM) generator inductance profile identification by using the stator flux or stator current vector control loop.

BACKGROUND OF THE INVENTION

PM generators, and in particular interior permanent magnet (IPM) generators, have the advantage of high power conversion efficiency and robust mechanical structure.

Loading a PM generator with an electrical power of desired value and quality can have two issues:
1. The parameters of the generators could be inconsistent from the designed value and deviate from manufacturer to manufacturer, and
2. Parameters like machine inductances are heavily dependant on the machine loading conditions.

In particular, load dependent machine inductances make it difficult to achieve optimized efficiency during operation. Moreover, system stability could be greatly affected if the generator parameter deviates too far away from its designed value.

Thus, there is a need for an on-the-fly determination of the generator parameters, in particular an on-the-fly determination of machine inductance profiles.

It may be seen as an object of embodiments of the present invention to provide a method for on-the-fly generator inductance profile identification by using the stator flux or stator current vector control loop.

DESCRIPTION OF THE INVENTION

The present invention relates to a new approach for PM generator inductance profile identification by using the stator flux or stator current vector control loop.

The advantages of the proposed solution according to the present invention are:
1. The invention mitigates the risk of power control instability due to mismatched machine parameters from the nominal value given by the machine designers.
2. The invention effectively tracks the generator inductance for all operating conditions along the power curve. This makes the electrical power loading reliable irrespective of the generator type and independent of the operating condition.
3. The method according to the present invention can be used to evaluate the machine design and give valuable feedback to improve the generator design.
4. The method for stator inductance identification according to the present invention is general and can be applied for both surface mount permanent magnet (SPM) generator and interior permanent magnet (IPM) generator since the same flux observer and current measurement could be applied for both SPM and IPM. SPM can be treated as IPM machine with very small saliency ratio.
5. The method according to the present invention can be applied for both stator flux vector control system and stator current vector control system. For both control systems, a voltage mode stator flux observer is applied so that the effect of inaccurate stator inductance value used in control is eliminated in the identification process.
6. The proposed stator inductance profile identification method according to the present invention may be implemented as a software algorithm which can be easily integrated into the converter start-up process without extra hardware cost.
7. A simple and reliable sinusoidal response amplitude measurement method is proposed to avoid using FFT or complicated peak-detection algorithm.
8. The effect of stator inductance variation due to magnetic circuit saturation at high current can be eliminated by applying the identification results in control, which makes it possible to achieve stable and optimized control performance even for IPM with high saliency ratio.

Accurate stator flux estimation is possible using current mode stator flux observer after stator inductance profile has been identified and applied. This makes it possible to apply stator flux control at extremely low speed in WTG direct drive application.

Thus, in a first aspect the present invention relates to a method for determining an inductance of a PM machine during operation of said PM machine, the method comprising the steps of:
a) operating a PM machine within a predetermined rotational speed window,
b) ramping up a DC level of a first reference signal until a desired first current level has been reached,
c) computing a DC level of a second reference signal using voltage limiting constraint to ensure sufficient field weakening current is provided in the process of the DC level ramping up of the first reference signal,
d) adding a first time dependent AC test signal on the DC level of both the first reference signal and the second reference signal,
e) computing a first self-saturation induced inductance value in response to the applied first time dependent AC test signal, and storing said first self-saturation induced inductance value in suitable memory means,
f) computing a first cross-saturation induced inductance value in response to the applied first time dependent test signal, and storing said first cross-saturation induced inductance value in the memory means,
g) removing the first time dependent AC test signal,
h) repeating steps b)-g) until the self-saturation induced inductance and the cross-saturation induced inductance have been calculated and stored for a predetermined number of first current levels, and
i) removing the first time dependent AC test signal, and ramping down the DC level of the first reference signal to zero.

The method according to the first aspect may further comprise the steps of:
a) ramping up the DC level of the first and second reference signals until desired current levels have been reached, b) adding a time dependent AC test signal on the DC level of both the first reference signal and the second reference signal, c) computing a second self-saturation induced inductance value in response to the applied second time dependent AC test signal, and storing said second self-saturation induced inductance value in the memory means, d) computing a second cross-saturation induced inductance value, in response to the applied second time dependent AC test signal, and storing said second cross-saturation induced inductance value in the memory means, e) removing the second time dependent AC test signal f) repeating steps c)-e) until the self-saturation induced inductance and the cross-saturation induced inductance have been calculated and stored for a predetermined number of second current levels, and g) removing the second time dependent AC test signal, and ramping down the DC reference signals to zero.

The DC reference signals with AC signal added may be converted to stator flux reference signals using the nominal Ld and nominal Lq inductance when the method is applied to PM generator controlled by a stator flux controller.

Alternatively, the DC reference signals with AC signal added may be stator current reference signals when the method is applied to a PM generator controlled by the stator current controller.

The stator inductance identification may be implemented as part of the PM generator start-up process before a power control loop is closed. The same stator flux controller or the stator current controller may be operated in the normal power control mode after the stator inductance identification is completed.

A voltage mode stator flux observer may be applied to obtain the stator flux signal in stator inductance identification process for both stator flux control system and stator current control system.

The self-saturation induced q-axis (or d-axis) stator inductance value may be computed as the ratio of the AC response of q-axis (or d-axis) stator flux signal and the AC response of the corresponding q-axis (or d-axis) stator current signal at a predetermined number of DC levels of q-axis (or d-axis) current with d-axis (or q-axis) current DC level set closer to zero.

Similarly, the cross-saturation induced q-axis (or d-axis) stator inductance value may be computed as the ratio of the AC response of q-axis (or d-axis) stator flux signal and the AC response of the corresponding q-axis (or d-axis) stator current signal at a predetermined number of DC levels of d-axis (or q-axis) current with q-axis (or d-axis) current DC level set closer to zero.

In the stator inductance identification process, the corresponding stator currents may be driven from low current level to high current level by the corresponding DC reference signals so that the entire operation current range of PM generator may be covered in the inductance profile identification process.

The stator inductance identification may be carried out in the predetermined rotational speed window. The speed should be chosen high enough to ensure the stator flux obtained from voltage mode stator flux observer is accurate and to allow large current applied in stator inductance identification process without exceeding the mechanical torque limit. The speed should be chosen to be lower than the field weakening operation speed of PM machine and in the mean while to allow large stator current applied in identification process without exceeding the power limit of generator control system.

In an embodiment of the method according to the present invention, the time dependent AC test signal added to the DC reference signals is a sinusoidal signal of fixed frequency. However, other types of time dependent AC test signal like square signal or triangle signal of fixed frequency may be applied as excitation signal as well. The frequency of the AC test signal is chosen in the range from 30 Hz to 100 Hz to minimize undesired low frequency torque ripple induced in inductance identification process. For reliable computation of inductance value, the frequency of the AC testing signal should be set below the bandwidth of the corresponding stator flux controller or the stator current controller to ensure sufficient AC response on stator current and stator flux. The amplitude of the AC test signal is chosen so that the AC current response is around 10% to 20% of the rated current of the machine.

In a embodiment, the AC response amplitudes of the stator flux and stator current may be computed from the orthogonal signal generated by the resonant filter at the injection frequency and a 900 phase shift filter. The DC component of stator flux and stator current may be removed by the resonant filter. However, other AC response amplitude measurement method can also be used for the same purpose.

The predetermined numbers of first and second current levels may be decided by the desired resolution of stator inductance profile, the stator current range for inductance identification and time spending on stator inductance identification. Normally, 4 to 10 current level should be sufficient.

The first desired current may correspond to q-axis stator current, and the second desired current may correspond to d-axis stator current. Accordingly, the first DC reference is corresponding to a q-axis stator current reference, and the second DC reference is corresponding to a d-axis stator current reference. Therefore, the first self-saturation inductance value stored is corresponding to a point in q-axis stator inductance "Lq" profile with respect to a DC level of q-axis current, and the second self-saturation inductance value stored is corresponding to a point in d-axis stator inductance "Ld" profile with respect to a DC level of d-axis current. Similarly, the first cross-saturation inductance value stored is corresponding to a point in d-axis stator inductance "Ld_CC" profile with respect to a DC level of q-axis current and the second self-saturation inductance value stored is corresponding to a point in q-axis stator inductance "Lq_CC" profile with respect to a DC level of d-axis current, Determined stator inductance profile data may be processed either on-line or off-line to obtain the stator inductance functions with respect to its self-saturation current and its cross-saturation current. The stator inductance functions thus obtained can be applied in the generator power control to optimize the control performance of PM machine for both stator flux control system and stator current control system. The stator inductance function can be applied to improve the accuracy of the current mode stator flux observer for the stator flux control system to improve its performance at low speed heavy load operation.

In a second aspect the present invention relates to a computer program product for carrying out the method according to any of the preceding claims when said computer program product is run on a computer.

BRIEF DESCRIPTION OF THE DRAWINGS

The present invention will now be explained in further details with reference to the accompanying drawings.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims. The application of this invention is not limited to a wind turbine generator machine but extends to the low speed high torque applications like lifts and conveyors that employ PM machines which normally operate at motoring mode operation.

DETAILED DESCRIPTION OF THE INVENTION

An embodiment of the present invention describes a simple method for IPM machine inductance profile identification based on voltage mode stator flux observation which could be easily applied in wind turbine application for both stator flux vector feedback control system and current vector feedback control system.

The foundation of the proposed method is the stator flux equation in rotor flux reference d-q frame as described using equation (1) and (2).

$$\psi_{sd} = L_d(i_{sd}, i_{sq}) * i_{sd} + \omega_r \quad (1)$$

$$\psi_{sq} = L_q(i_{sd}, i_{sq}) * i_{sq} \quad (2)$$

The stator inductance due to self-saturation effect at d-axis stator current level (denoted as "ISD_Test") and q-axis stator current level (denoted as "ISQ_Test") can be obtained from equation (3) and equation (4).

$$L_d(i_{sd}, i_{sq} \approx 0) = \left. \frac{\partial \psi_{sd}}{\partial i_{sd}} \right|_{isd=ISD\_Test} \quad (3)$$

$$L_q(i_{sd} \approx 0, i_{sq}) = \left. \frac{\partial \psi_{sq}}{\partial i_{sq}} \right|_{isq=ISQ\_Test} \quad (4)$$

Similarly, the stator inductance due to cross saturation effect can be obtained as:

$$L_{d\_CC}(i_{sd} \approx 0, i_{sq}) = \left. \frac{\partial \psi_{sd}}{\partial i_{sd}} \right|_{isq=ISQ\_Test} \quad (5)$$

$$L_{q\_CC}(i_{sd}, i_{sq} \approx 0) = \left. \frac{\partial \psi_{sq}}{\partial i_{sq}} \right|_{isd=ISD\_Test} \quad (6)$$

FIGS. 1A-1C and FIGS. 2A-2C illustrate the PM generator stator inductance identification schemes for the stator flux vector feedback control and stator current vector feedback control system, respectively.

Machine parameter identification method is independent of the control strategy employed.

For both stator flux control system and the stator current feedback control system, the stator inductance profile identification is performed by using stator flux estimation results obtained from the voltage mode stator flux observer which is insensitive to stator inductance variation. The stator inductance profile identification is carried out in a proper speed window. The speed should be high enough to ensure reliable and accurate estimation of stator flux from voltage mode stator flux observer and to avoid exceeding the torque limit of the generator system when high current is applied in identification process. The speed should not be too high to allow sufficient high current to be applied in identification process without exceeding the maximum power limit of the generator system. If possible, the speed window should be set below the field weakening operation speed so that the q-axis stator current can be driven to sufficiently high level to test the saturation effect of the generator with d-axis stator current closer to zero.

The stator inductance profile identification is primarily carried out in a high speed window with voltage mode stator flux observer applied. However, it has to be noted that, in normal power production control, the stator inductance identification results are applied to improve the control performance in both light and heavy loading conditions. In practice, on-line or off-line processing of the identified stator inductance profile is carried out so that the stator inductance can be represented as a function of the corresponding self-saturation current and cross-saturation current for this purpose.

Figure 1A:
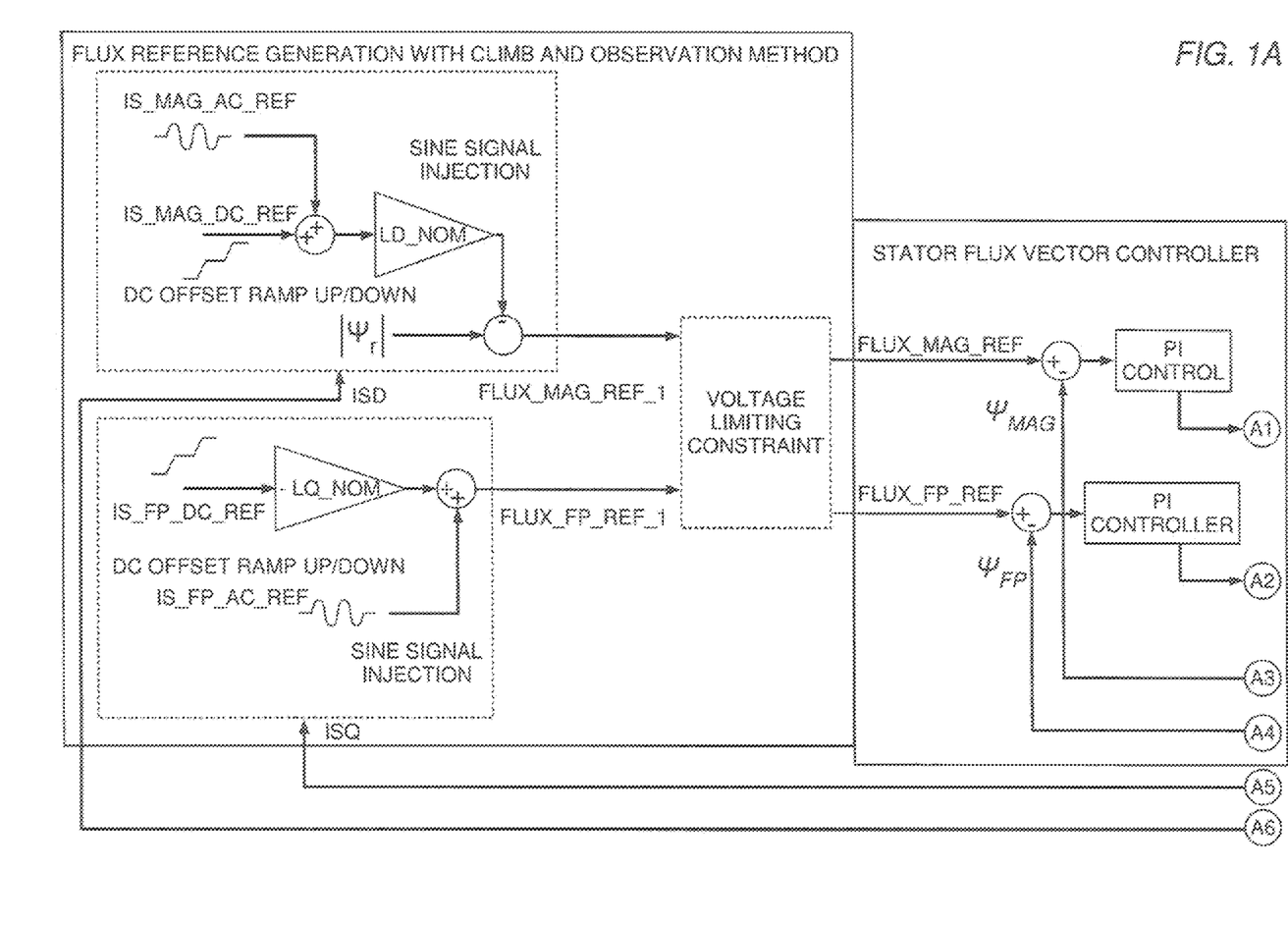
FIGS. 1A, 1B, and 1C illustrate inductance profile identification of a PM generator controlled applied to the stator flux vector feedback system.
Figure 1B:
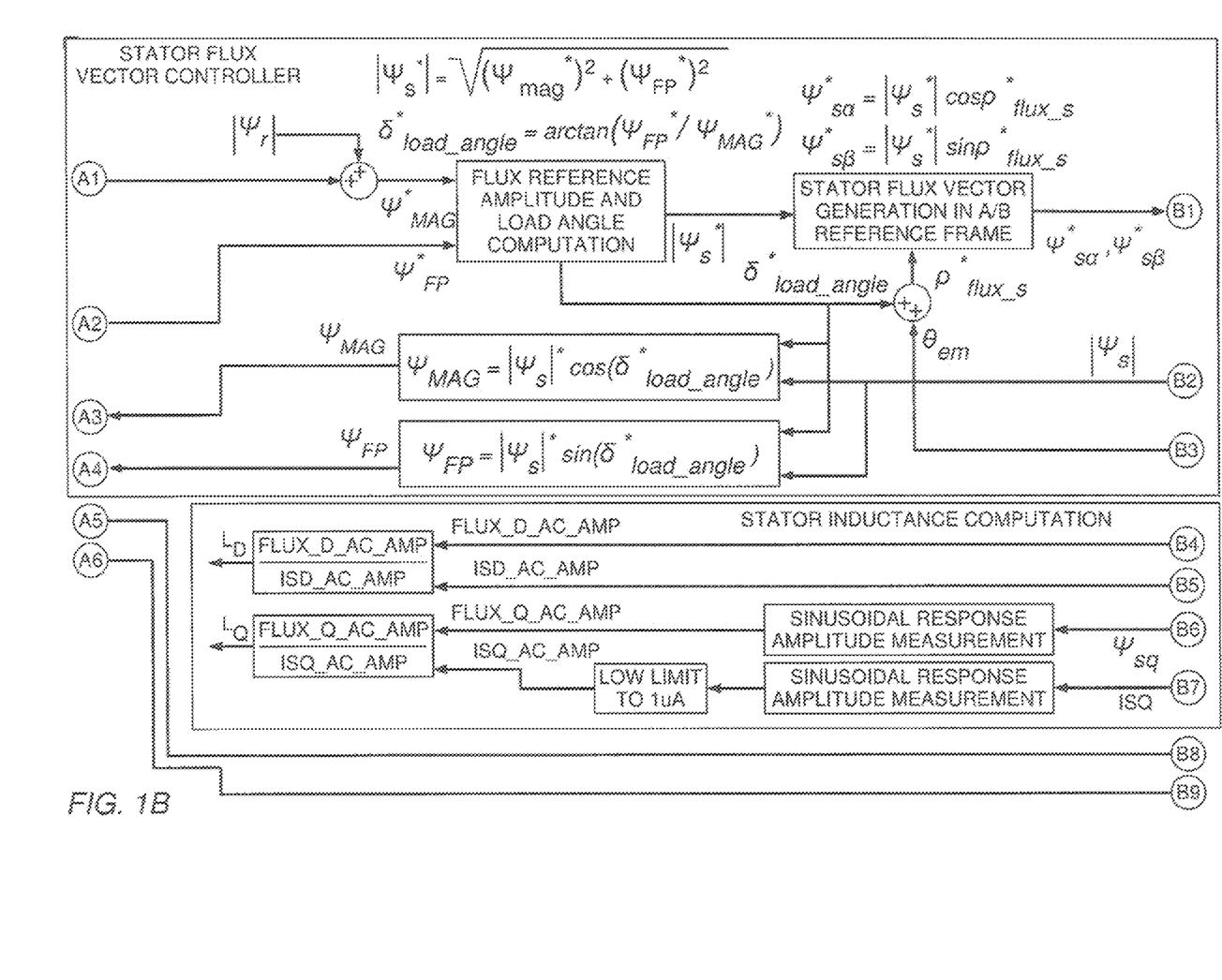
Figure 1C:
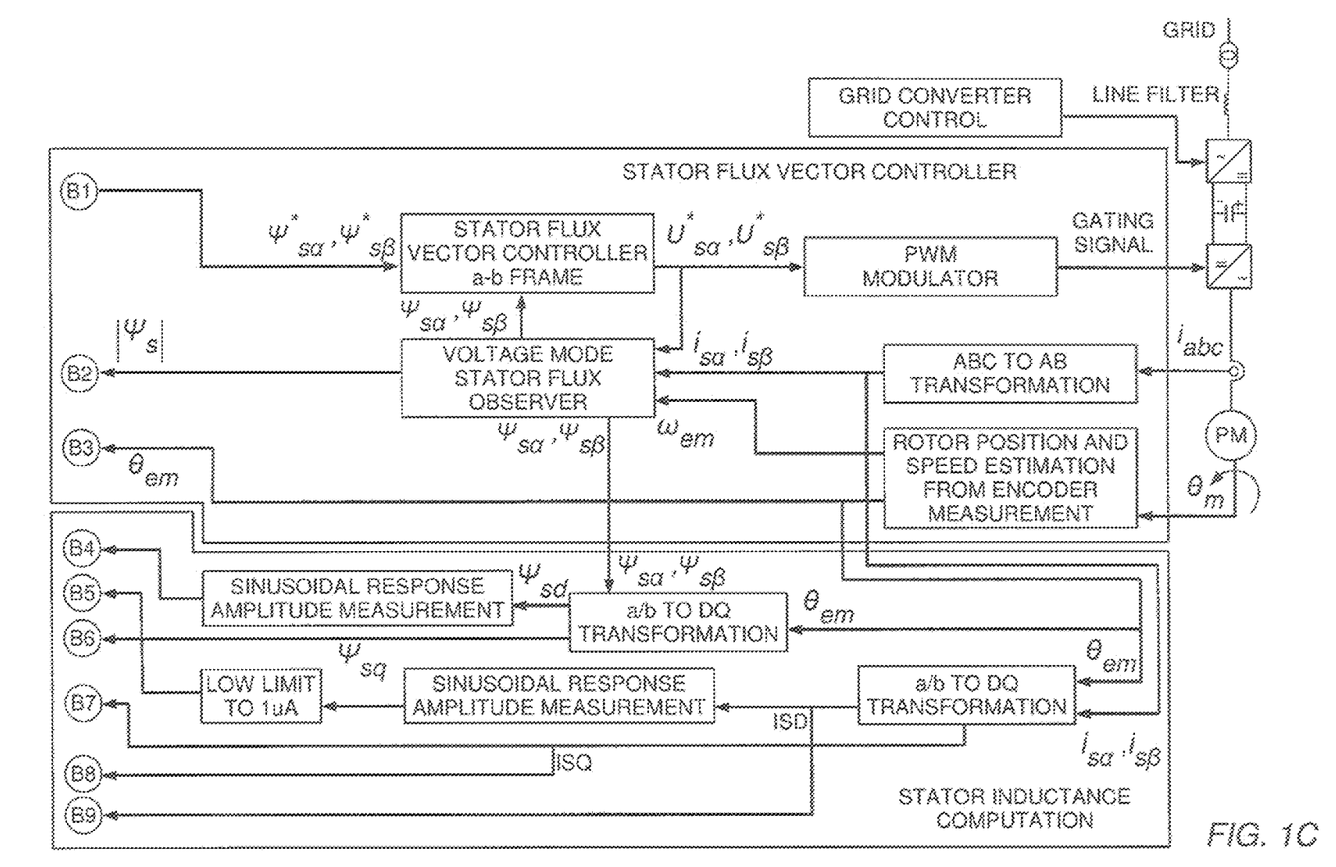

When the stator inductance identification is implemented in the stator flux control system as shown in FIGS. 1A-1C (which are logically connected through connections A1-A6 and B1-B9), the stator flux reference generation block and stator inductance computation block are activated together with the stator flux controller block. The generator power is directly controlled from the generated stator flux references. The current reference signals for magnet field power generation (denoted as "IS_FP_REF") and demagnetization (denoted as "IS_MAG_REF") with sinusoidal test signal injected are converted to the flux reference signals (denoted as "flux_FP_REF" and "flux_MAG_REF") using nominal Ld and nominal Lq value. The resulting flux reference signals are fed into the voltage limiting based field weakening block. The sinusoidal stator flux reference signal is thus injected into stator flux control system of PM machine. The stator flux reference signals are then fed into the stator flux reference correction proportional-integral (PI) controller. The resulting stator flux references after correction control are then converted to stationary reference frame. The output of stator flux vector controller is voltage reference signals which is fed into the PWM modulator. The converter gating signal is generated by the PWM modulator. Finally, the stator flux vector feedback control loop is closed in stationary reference frame using the observed stator flux feedback signal. The stator inductance value is computed using the measured stator current signal and the observed stator flux signal in the stator inductance computation block. In this block, the stator flux signal and stator current signal are first transferred to the rotor flux d-q reference frame. Afterwards, the sinusoidal response amplitude of both stator flux signal and stator current signal are extracted. Lastly, the stator inductance is computed as the ratio the sinusoidal response amplitude of stator flux signal vs. stator current signal. The sinusoidal response amplitude of the stator current signal is limited to be above 1 uA to avoid divided-by-zero issue in the ratio computation.

Figure 2A:
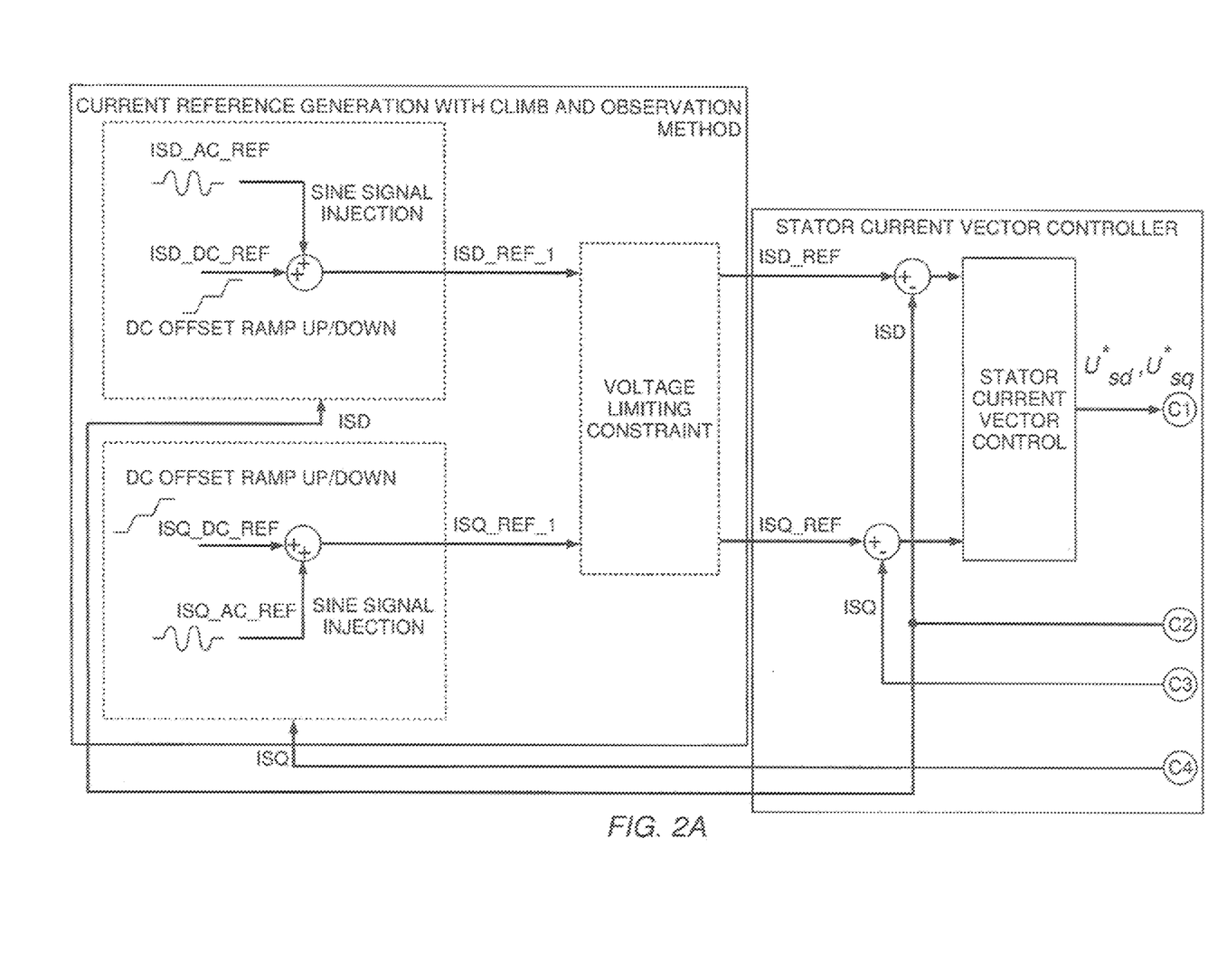
FIGS. 2A, 2B, and 2C illustrate inductance profile identification of a PM generator controlled applied to the stator current vector feedback system.
Figure 2B:
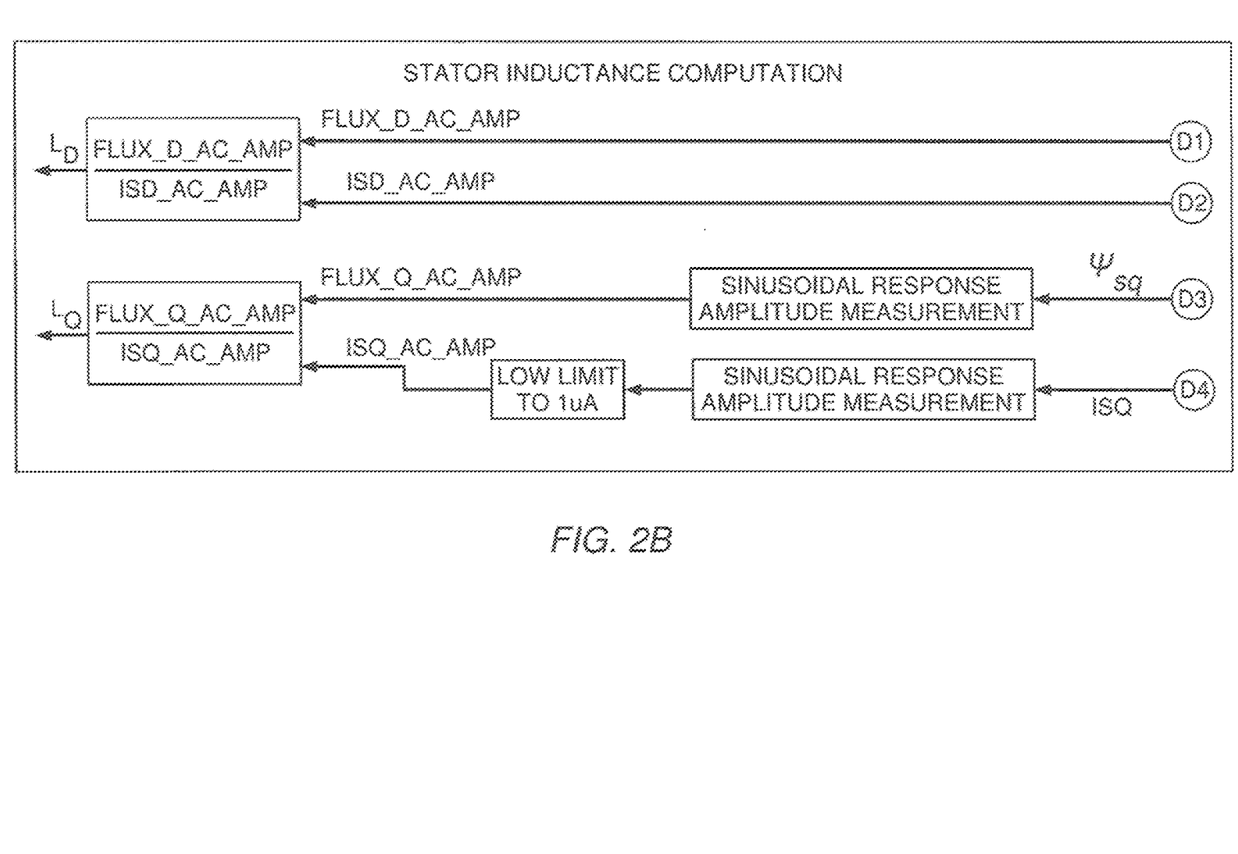
Figure 2C:
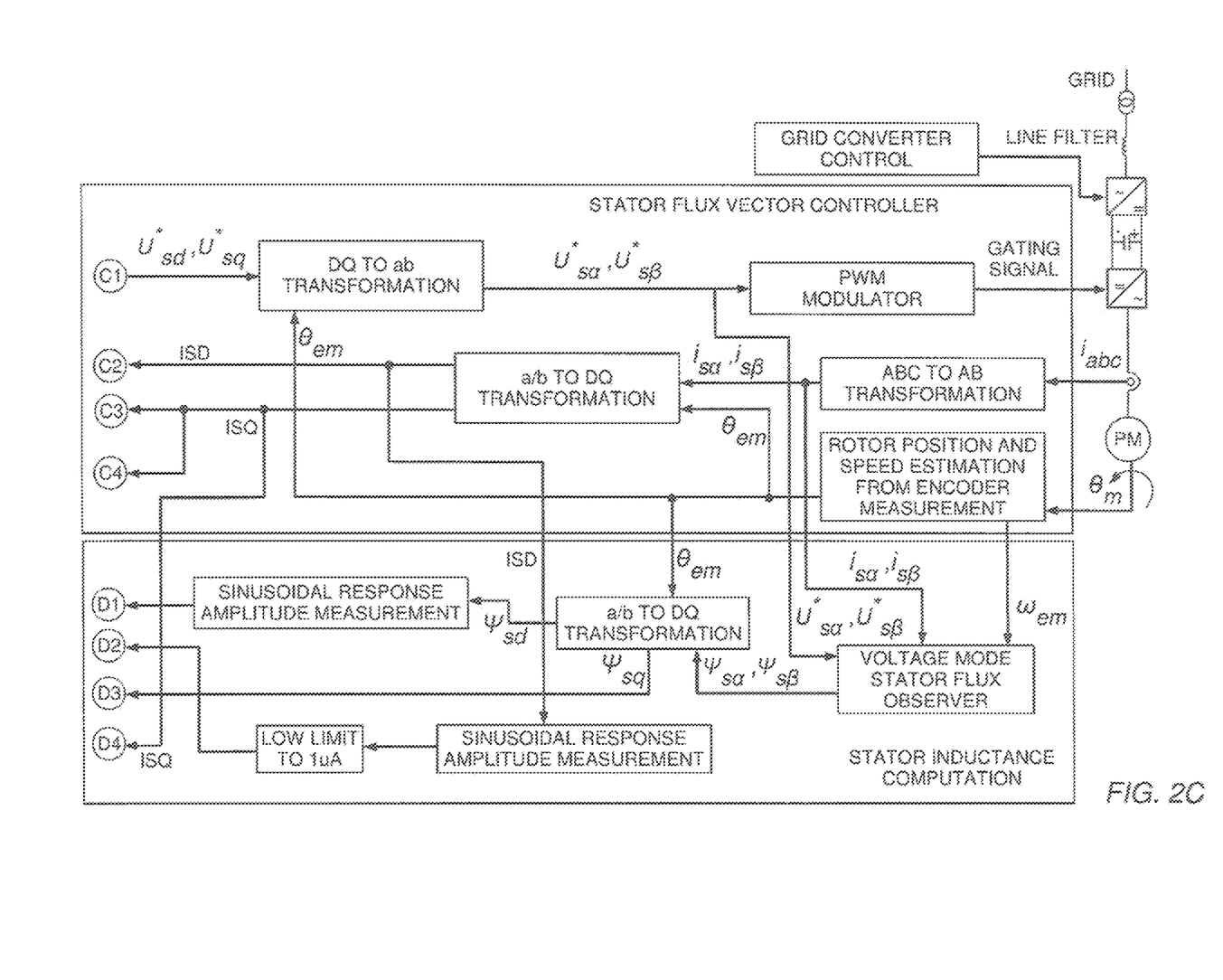

When the stator inductance identification is implemented in the stator current control system as shown in FIGS. 2A-2C (which are logically connected through connections C1-C4 and D1-D4), the stator current reference generation block and stator inductance computation block are activated together with the stator current controller. The generator power is directly controlled by the generated current references. The current reference signals with sinusoidal test signal injected are fed into the voltage limiting based field weakening block. The sinusoidal stator current reference signal is thus injected into stator current control system of PM machine. The stator current vector feedback control is closed with the measured stator current feedback signal in rotor flux reference d-q frame. The stator voltage signals are then converted into stationary reference frame and fed into PWM modulator. For the stator current control system, the voltage mode stator flux observer is implemented in the stator inductance computation block. The rest part of the stator inductance value computation is same as the stator flux control system.

More detailed description of the station inductance identification method is given below.

The method according to the present invention uses the flux/current closed loop control to ramp up/down the d-axis or q-axis stator current to the desired DC amplitude level by changing the stator flux/current reference signal while monitoring the measured corresponding d-axis or q-axis stator current.

In the process of ramping up/down the q-axis stator current DC level, voltage limiting constraint is applied to avoid the PWM modulator working in non-linear modulation range by providing sufficient d-axis weakening field current if necessary at high speed in stator inductance identification process. For simplicity, in the process of ramping up/down the d-axis stator current level, the q-axis stator flux/current reference is set to zero since in this case the voltage limiting constraint is naturally satisfied.

When the desired d-axis or q-axis stator current level is reached, a fixed frequency sinusoidal stator flux/current reference disturbance signal of small amplitude is injected into the stator flux/current control system. The corresponding d-axis or q-axis stator inductance including the self-saturation effect and cross-saturation effect is then computed using equation (7) to (10) from the sinusoidal response of the corresponding stator flux and stator current signals.

$$L_d(i_{sd}, i_{sq} \approx 0) = \frac{FLUX\_D\_AC\_AMP}{ISD\_AC\_AMP}\bigg|_{i_{sd}=ISD\_TEST} \quad (7)$$

$$L_{q\_CC}(i_{sd}, i_{sq} \approx 0) = \frac{FLUX\_Q\_AC\_AMP}{ISQ\_AC\_AMP}\bigg|_{i_{ssd}=ISD\_TEST} \quad (8)$$

$$L_q(i_{sd} \approx 0, i_{sq}) = \frac{FLUX\_Q\_AC\_AMP}{ISQ\_AC\_AMP}\bigg|_{i_{sq}=ISQ\_TEST} \quad (9)$$

$$L_{d\_CC}(i_{sd} \approx 0, i_{sq}) = \frac{FLUX\_D\_AC\_AMP}{ISD\_AC\_AMP}\bigg|_{i_{sq}=ISQ\_TEST} \quad (10)$$

For both stator flux vector control and stator current vector control, the voltage mode stator flux observer is used for stator inductance estimation. The principle behind voltage mode stator flux observation is represented as equation (11) and (12) in stator stationary α/β reference frame.

$$\psi_{s\alpha} = \int (U_{s\alpha} - Rs * i_{s\alpha}) dt \quad (11)$$

$$\psi_{s\beta} = \int (U_{s\beta} - Rs * i_{s\beta}) dt \quad (12)$$

To simplify the implementation, the stator voltage command signals $U^*_{s\alpha}, U^*_{s\beta}$ (PWM modulator input signals) could be used as stator voltage signals for voltage mode stator flux observation.

Various known techniques could be used to eliminate the integration drifting due to DC offset of stator current measurement of voltage mode stator flux observer and to minimize the effect of the control quantization error. One possible approach that can achieve this purpose is the adaptive low pass filter based voltage mode flux observer given in equation (13) and (14), where, "V_VM" is a coefficient to shape the low pass filter magnitude response at low frequency range and $\omega_{em}$ is the rotor electrical angular speed estimated from encoder position measurement.

$$\psi_{s\alpha} = \frac{(u^*_{s\alpha} - Rs * i_{s\alpha}) + K\_VM * (u^*_{s\beta} - Rs * i_{s\beta})}{s + \omega_{em} * K\_VM} \quad (13)$$

$$\psi_{s\beta} = \frac{(u^*_{s\beta} - Rs * i_{s\beta}) - K\_VM * (u^*_{s\alpha} - Rs * i_{s\alpha})}{s + \omega_{em} * K\_VM} \quad (14)$$

The output stator flux vector $\Psi_{s\alpha}, \Psi_{s\beta}$ from voltage mode stator flux observer is transferred to the rotor flux reference DQ reference using equation (15) and (16), where $\theta_{em}$ is the electrical angle of rotor flux with respect to the α-axis of the stator stationary reference frame.

$$\psi_{sd} = \psi_{s\alpha} * \cos\theta_{em} + \psi_{s\beta} * \sin\theta_{em} \quad (11)$$

$$\psi_{sq} = \psi_{s\alpha} * \sin\theta_{em} + \psi_{s\beta} * \cos\theta_{em} \quad (12)$$

For the stator flux vector control based control scheme, the stator flux reference vector is generated by applying the voltage limiting constraint described in equation (17), where "modu_max" is the maximum allowed PWM modulation index, "Udc" is the DC link voltage signal. The Input signal is the field power stator flux reference (denoted as FLUX_F-P_REF) signal. The output signal is the stator magnetization flux reference (denoted as FLUX_MAG_REF).

$$FLUX\_MAG\_REF = \min\left(\psi_r, \sqrt{\left(modu\_max * \frac{U_{dc}}{\sqrt{3} * \omega_{em}}\right)^2 - (FLUX\_FP\_REF)^2}\right) \quad (17)$$

For the stator current vector control based control scheme, the stator current reference vector is generated by applying the voltage limiting constraint described in equation (18), where "Ld_nom" and "Lq_nom" are the nominal d-axis and q-axis stator inductance value, $\Psi_r$ is magnetic rotor flux amplitude. The Input signal is the q-axis stator current reference (denoted as ISQ_REF) signal. The output signal is the stator d-axis current reference (denoted as ISD_REF).

$$\text{ISD\_REF} = \min\left(0, -\frac{\psi_r}{L_{d\_nom}} + \sqrt{\left(\text{modu\_max} * \frac{U_{dc}}{\sqrt{3} * \omega_{em} * L_{d\_nom}}\right)^2 - \left(\frac{L_{q\_nom}}{L_{d\_nom}} * \text{ISQ\_REF}\right)^2}\right) \quad (18)$$

Figure 3:
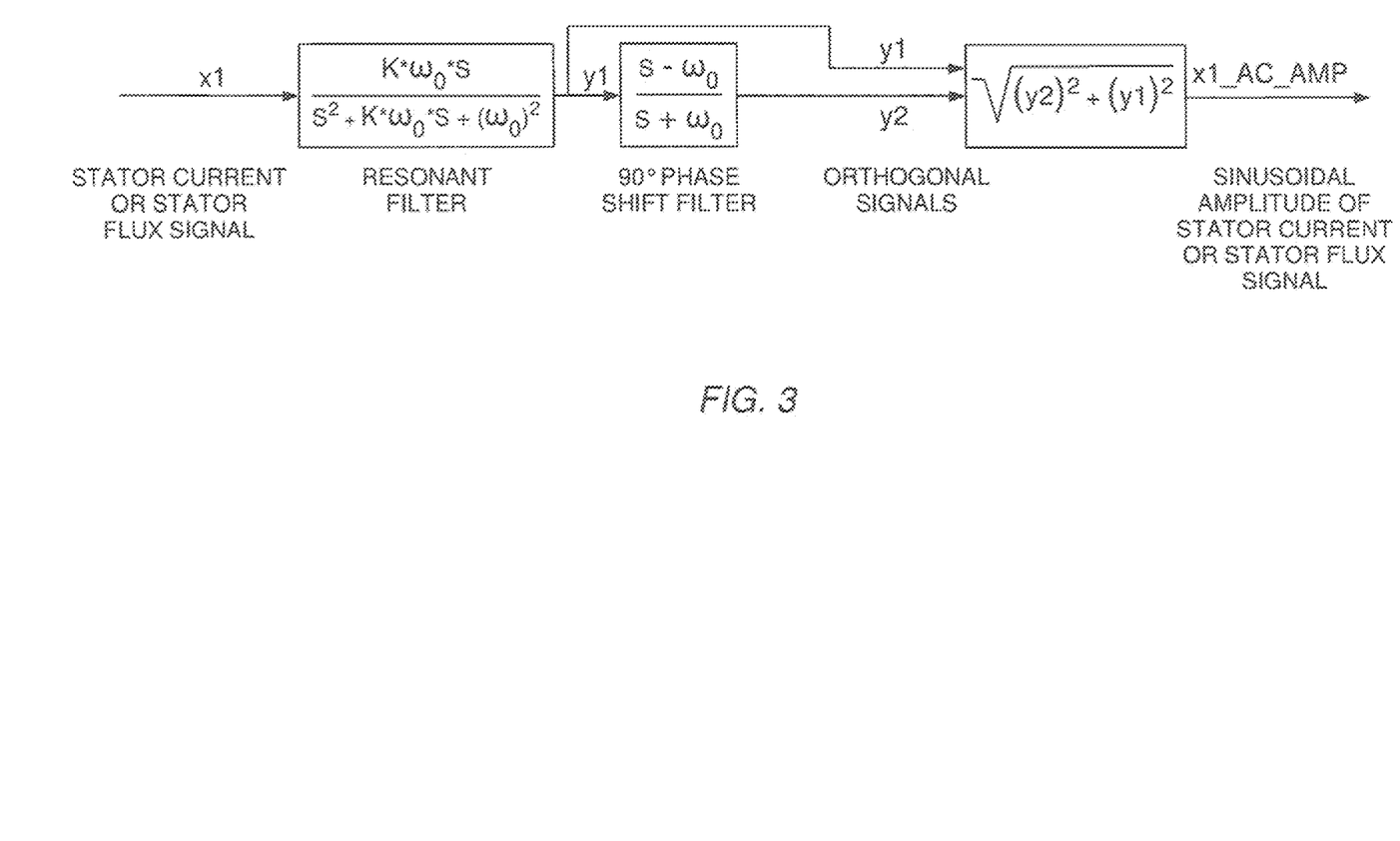
FIG. 3 shows a sinusoidal response amplitude measurement method using a resonant filter and 900 phase shift filter for a fixed signal frequency.

FIG. 3 shows a simple and effective method for sinusoidal response amplitude measurement for the d-axis or q-axis stator flux/current signals. The injected sinusoidal disturbance signal has a frequency defined as f_Disturb, the angular frequency of injected signal is represented as $\omega_o = 2\pi f\_Disturb$. The d-axis or q-axis flux/current signal is fed into a resonant filter to remove the DC component and the frequency component other than the injected disturbance signal frequency. The resonant filter output signal is then phase shifted 90° using a phase shift filter. The sinusoidal response amplitude of the signal is computed from the orthogonal signals before and after 90° phase shift.

The transfer function of the resonant filter is given by equation (19), where "x1" is resonant filter input signal, "y1" is resonant filter output signal, and "K" is the resonant band width adjustment coefficient. The transfer function of the 90° phase shift filter is given in equation (20), where "y1" is phase shift filter input signal and "y2" is phase shift filter output signal. The sine response amplitude of signal "x1" (denoted as "X1_AC_AMP") is computed from equation (21).

$$\frac{y1}{x1} = \frac{K * \omega_0 * s}{s^2 + K * \omega_0 * s + (\omega_0)^2} \quad (19)$$

$$\frac{y2}{y1} = \frac{s - \omega_0}{s + \omega_0} \quad (20)$$

$$x1\_AC\_AMP = \sqrt{(y2)^2 + (y1)^2} \quad (21)$$

Figure 4A:
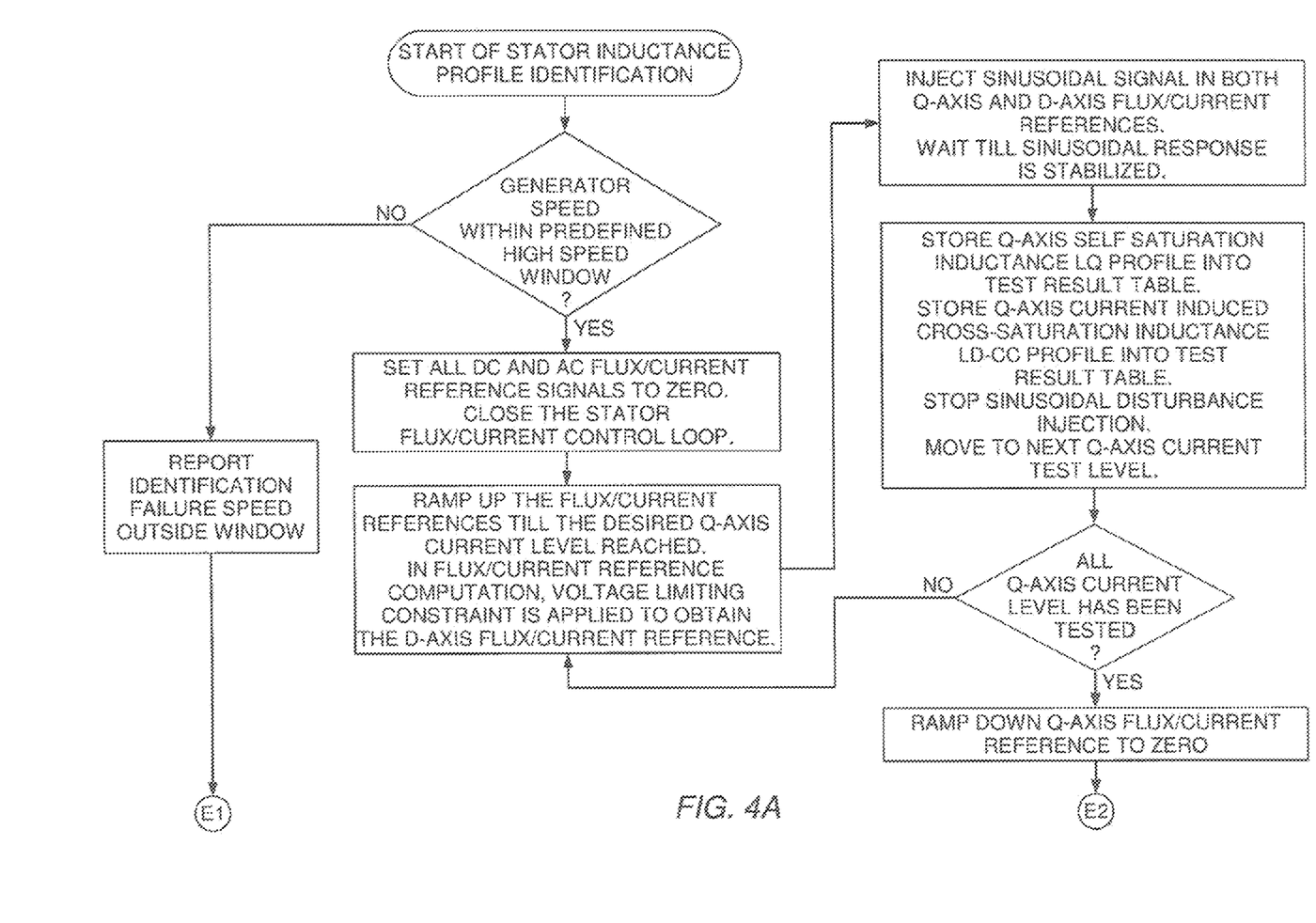
FIGS. 4A and 4B show a generalized procedure for stator inductance profile identification.
Figure 4B:
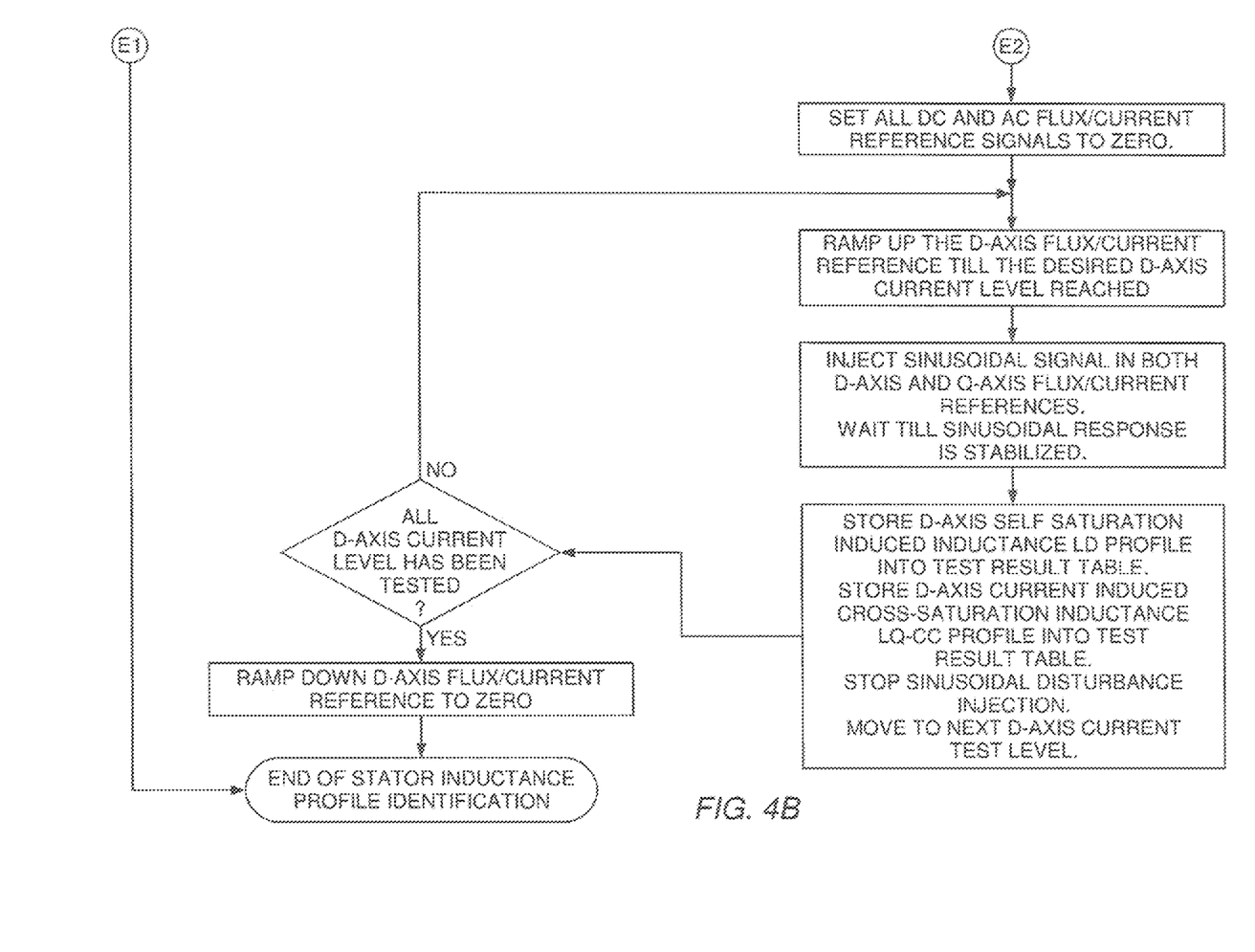

FIGS. 4A and 4B (which are logically connected through connections E1 and E2) illustrate the general implementation procedure for stator inductance profile identification which is applicable for both stator flux vector control system and stator current vector control system.

To simplify the implementation, the self-saturation "Lq" profile and cross-saturation "Ld" profile can be identified separately from the self-saturation "Ld" and cross-saturation "Lq" profile in two sequential stages as described below:

The first stage is the process of the self-saturation induced "Lq" profile and cross saturation induced "Ld_CC" profile identification. In this stage, the q-axis stator flux/current reference level is adjusted so that the q-axis current is ramped to the desired testing q-axis current level (denoted as "ISQ_Test"). The d-axis flux/current reference is computed from the voltage limit constraint with minimum d-axis current applied sufficient to keep the PWM modulator working in linear modulation range when speed is high in identification process. When the desired q-axis test current level is reached, a sinusoidal disturbance signal of small amplitude is injected into the both d-axis and q-axis stator/flux current reference. A certain time delay is applied to wait for the system transition dynamic disappeared. Afterwards, the computed "Lq" is stored into the self-saturation "Lq" profile table and computed "Ld" is stored into the cross-saturation "Ld_CC" profile table. When inductance measurement on one ISQ_Test level is obtained, the sinusoidal single disturbance injection is removed. Then, after the signal transition disappeared, the q-axis stator current (low pass filtering can be applied to removed measurement noise) is stored into ISQ table corresponding to the "Lq" and "Ld_CC" profile table. The stator flux/current references are ramped up/down to the next "ISQ_Test" current level and the process repeats till the inductance profile measurement at all ISQ test current level has been completed. Afterwards, the stator flux/current references are ramped down to zero and the first stage for stator inductance profile identification is thus completed.

The second stage is the process of the self-saturation "Ld" profile and cross-saturation "Lq_CC" profile identification. In the second stage, the identification is performed in a similar way as the first stage identification process. The only difference is that q-axis stator flux/current reference is closer to zero during d-axis testing current (denoted as "ISD_Test") ramp up/down process.

Figure 5:
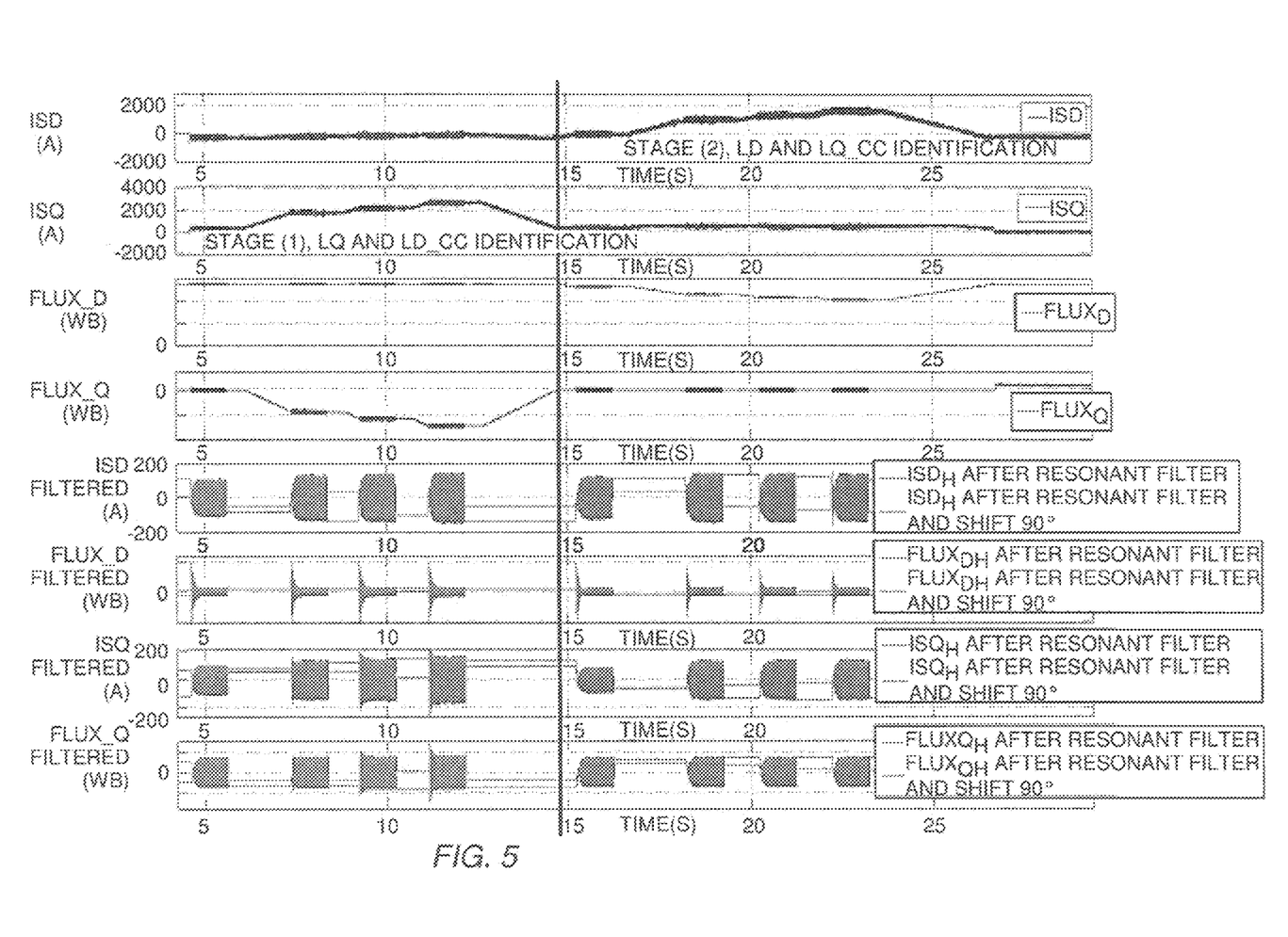
FIG. 5 illustrates the measured stator current and estimated stator flux signal responses of an IPM machine in the stator inductance identification process.
Figure 6:
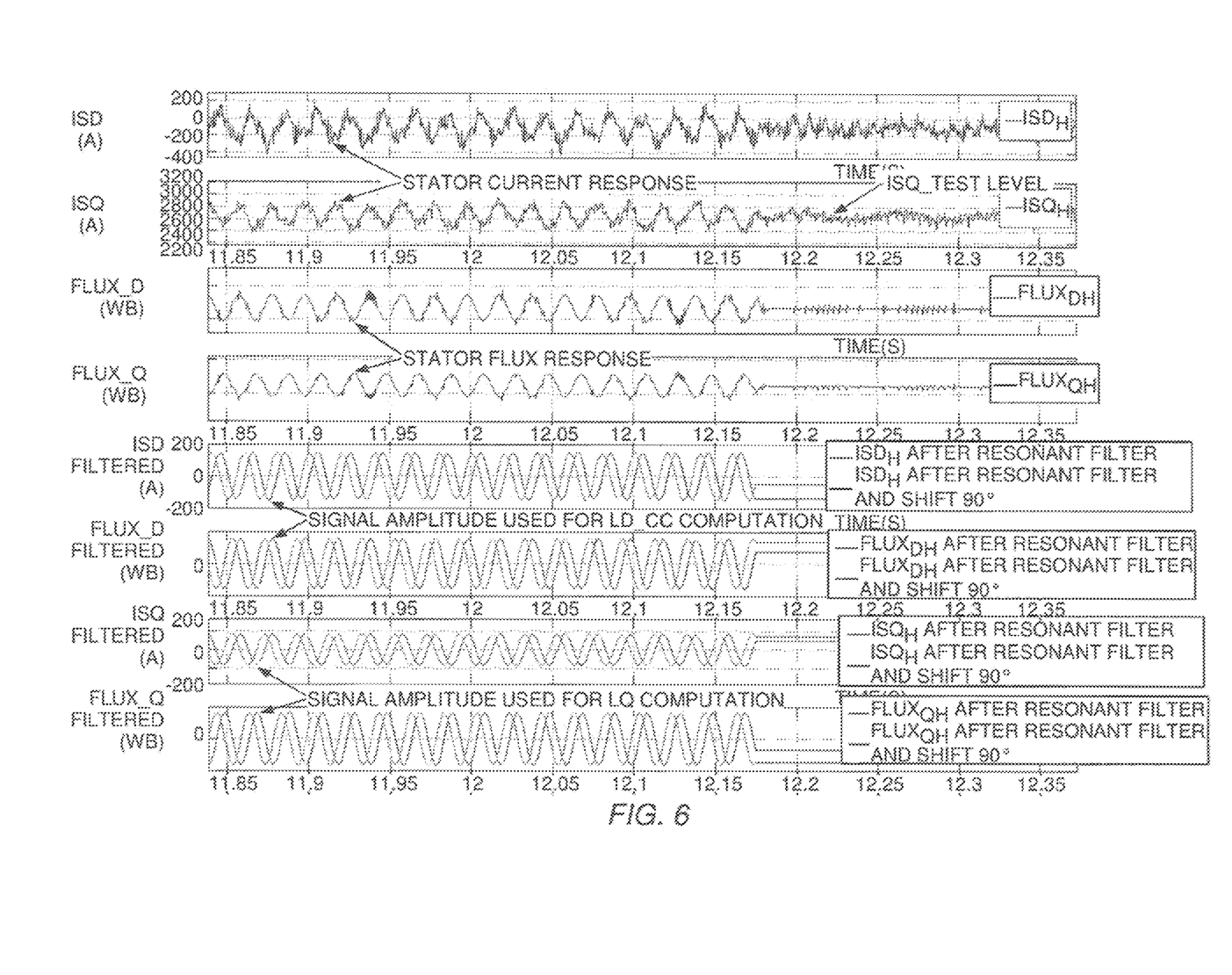
FIG. 6 illustrates the measured stator flux and stator current signal responses of an IPM machine in the process of identification of self-saturation induced "Lq" inductance value and cross-saturation induced "Ld" inductance value at a testing current level ISQ=ISQ_test and ISD≈0.
Figure 7:
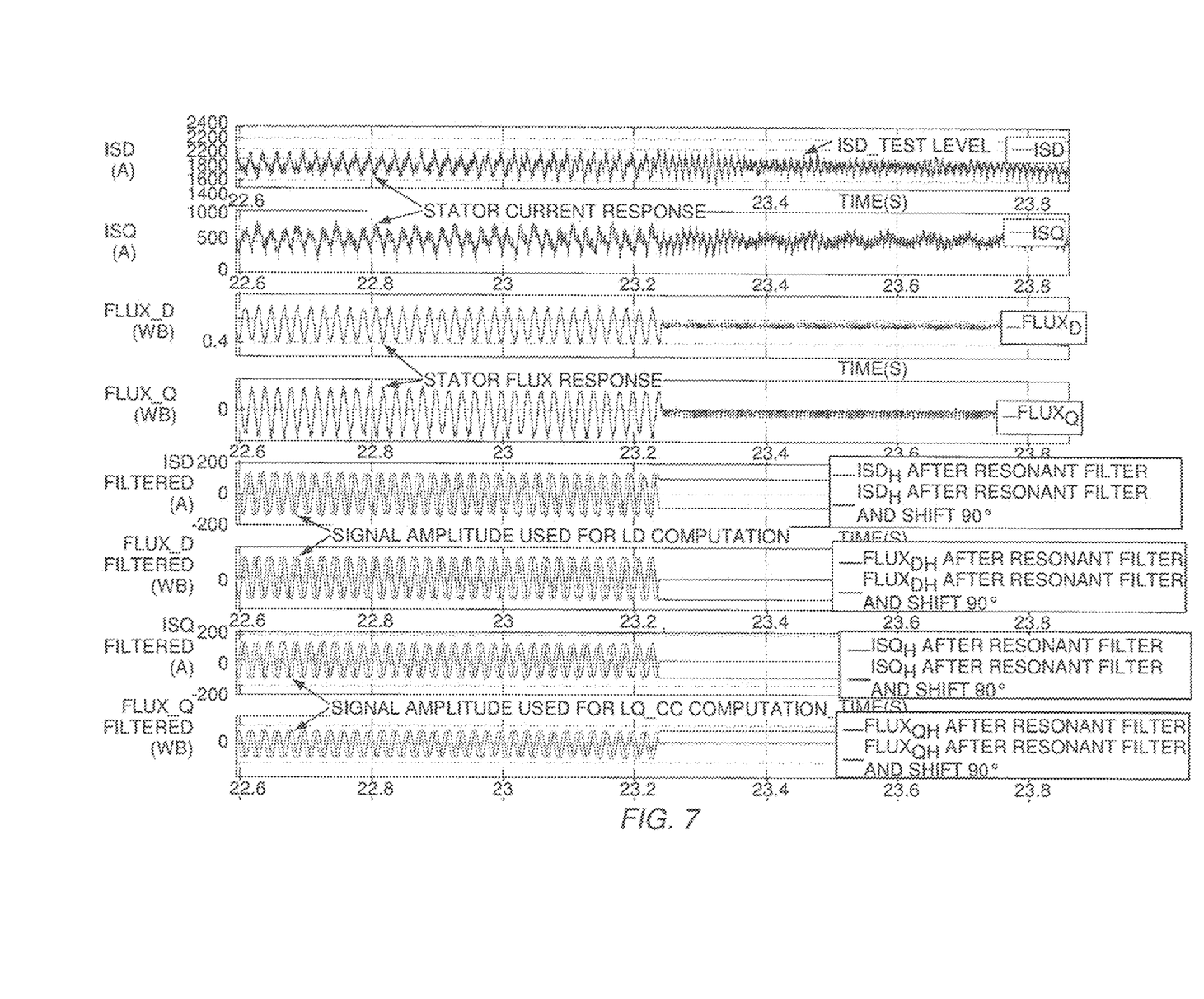
FIG. 7 illustrates the measured stator flux and stator current signal responses of an IPM machine in the process of identification of self-saturation induced "Ld" inductance value and cross-saturation induced "Lq" inductance value at a testing current level ISD=ISD_test and ISQ≈0.

The above stator inductance identification process is illustrated using the measurement data obtained in an IPM machine in the generator start-up process for a stator flux control system in FIG. 5, FIG. 6, and FIG. 7.

FIG. 5 shows the measured stator flux and stator current signals for the IPM machine from stage (1) to stage (2) of stator inductance identification process. The orthogonal sinusoidal signals for the corresponding stator current or stator flux signals after the resonant filter and the 90° phase shift filter are also given in FIG. 5.

FIG. 6 shows the zoom-in plot of FIG. 5 in inductance identification stage (1) at stator current level ISQ around 2800A and ISD around 100A. The self-saturation induced "Lq" inductance value and cross-saturation induced "Ld" inductance value at ISQ=2800A are thus identified and stored in to the corresponding "Lq" profile table and "Ld_CC" profile table.

FIG. 7 shows the zoom-in plot of FIG. 5 in inductance identification stage (2) at stator current level ISQ around 500A and stator current ISD around 1700A. The self-saturation induced "Ld" inductance value and cross-saturation induced "Lq" inductance value at ISD=1700A are thus identified and stored in to the corresponding "Ld" profile table and "Lq_CC" profile table.

NOMENCLATURE $\theta_m$ rotor mechanical position
$\theta_{em}$ rotor electrical position estimated from encoder position measurement
$\theta_{em}$ rotor electrical angular speed estimated from encoder position measurement
$\psi_r$ magnetic rotor flux amplitude
Udc DC link voltage
Rs stator resistance
$L_d$ actual d-axis stator inductance
$L_q$ actual q-axis stator inductance
Ld_NOM nominal d-axis stator inductance
Lq_NOM nominal q-axis stator inductance
$i^*_{FP}$ or IS_FP_REF field power stator current reference
$i^*_{MAG}$ or IS_MAG_REF magnetization current reference
$i^*_{FP\_AC}$ or IS_FP_AC_REF field power stator current sinusoidal test reference signal i*$_{mag\_AC}$ or IS_MAG_AC_REF magnetization current sinusoidal test reference signal i*$_{FP\_DC}$ or IS_FP_DC_REF field power stator current reference signal magnitude level used in test i*$_{mag\_DC}$ or IS_MAG_DC_magnetization current reference signal magnitude level used in test ψ*$_{FP\_1}$ or FLUX_FP_REF_1 field power stator flux reference before voltage limiting constraint applied ψ*$_{MAG\_1}$ or FLUX_MAG_REF_1 magnetization flux reference before voltage limiting constraint applied ψ*$_{FP}$ or FLUX_FP_REF field power stator flux reference after voltage limiting constraint applied ψ*$_{MAG}$ or FLUX_MAG_REF magnetization flux reference after voltage limiting constraint applied i*$_{sd\_AC}$ (or ISD_AC_REF) sinusoidal D-axis stator current reference signal i*$_{sq\_AC}$ (or ISD_AC_REF) sinusoidal Q-axis stator current reference signal i*$_{sd\_DC}$ (or ISD_DC_REF) D-axis stator current reference amplitude level used in test i*$_{sq\_DC}$ (or ISD_DC_REF) Q-axis stator current reference amplitude level used in test i*$_{sd\_1}$ (or ISD_REF_1) D-axis stator current reference signal before voltage limiting constraint applied i*$_{sq\_1}$ (or ISQ_REF_1) Q-axis stator current reference signal before voltage limiting constraint applied i*$_{sd}$(or ISD_REF_) D-axis stator current reference signal after voltage limiting constraint applied i*$_{sq}$(or ISQ_REF_) Q-axis stator current reference signal after voltage limiting constraint applied U*$_{s\alpha}$ stator voltage reference α component
U*$_{s\beta}$ stator voltage reference β component
U*$_{sd}$ stator voltage reference D-axis component
U*$_{sq}$ stator voltage reference Q-axis component
U$_{s\alpha}$ stator voltage α component
U$_{s\beta}$ stator voltage β component
i$_{abc}$ measured stator three phase current
i$_{s\alpha}$ measured stator current α component
i$_{s\beta}$ measured stator current β component
i$_{sd}$ (or ISD) measured stator current D-axis component
i$_{sq}$ (or ISQ) measured stator current Q-axis component
ψ$_{s\alpha}$ observed stator flux α component
ψ$_{s\beta}$ observed stator flux β component
ψ$_{sd}$ observed stator flux D-axis component
ψ$_{sq}$ observed stator flux Q-axis component
FLUX_D_AC_AMP sinusoidal response amplitude of D-axis stator flux
FLUX_Q_AC_AMP sinusoidal response amplitude of Q-axis stator flux
ISD_AC_AMP sinusoidal response amplitude of D-axis stator current
ISQ_AC_AMP sinusoidal response amplitude of Q-axis stator current

The invention claimed is:

1. A method for determining an inductance of a permanent magnet (PM) machine during operation of said PM machine, the method comprising:
   (a) upon determining the PM machine is operating within a predetermined rotational speed window, ramping up a first DC level of a first reference signal until the PM machine produces a first current level,
   (b) computing a second DC level of a second reference signal,
   (c) applying a first AC test signal to each of the first and second reference signals,
   (d) computing a first self-saturation induced inductance value in response to applying the first AC test signal,
   (e) computing a first cross-saturation induced inductance value in response to applying the first AC test signal,
   (f) removing the first AC test signal,
   (g) repeating (a) through (f) until corresponding self-saturation induced inductance values and cross-saturation induced inductance values have been computed for a predetermined number of values of the first current level, and
   (h) removing the first AC test signal, and ramping down the first DC level to zero,
   wherein the first and second reference signals comprise stator flux reference signals generated using nominal Ld and Lq inductance values for the PM machine,
   wherein the PM machine comprises a PM generator controlled by a stator flux controller, and
   wherein the predetermined rotational speed window is included within one of a 1000-1500 rotations per minute (rpm) window, a 300-500 rpm window, and a 30-50 rpm window.

2. The method according to claim 1, further comprising:
   i) ramping up the first and second DC levels until the PM machine produces a second current level,
   j) applying a second AC test signal to each of the first and second reference signals,
   k) computing a second self-saturation induced inductance value in response to applying the second AC test signal,
   l) computing a second cross-saturation induced inductance value, in response to applying the second AC test signal,
   m) removing the second AC test signal,
   n) repeating k) through m) until corresponding self-saturation induced inductance values and the cross-saturation induced inductance values have been computed for a predetermined number of values of the second current level, and
   o) removing the second AC test signal, and ramping down the first and second DC levels to zero.

3. The method according to claim 2, wherein the first and second current levels are different.

4. The method according to claim 3, where the first current level is greater than the second current level.

5. The method according to claim 2, wherein the predetermined numbers of first and second current levels are each selected to have between five and ten current levels.

6. The method according to claim 1, wherein the first and second reference signals comprise stator current reference signals.

7. A method according to claim 6, further comprising the generating the stator current reference signals, wherein the PM machine comprises a PM generator controlled by the stator current controller.

8. The method according to claim 1, wherein the PM machine is operated in a saturated state of operation.

9. A computer program product for carrying out the method according to claim 1 when said computer program product is run on a computer.

10. A method of determining an inductance profile of a permanent magnet (PM) machine while operating within a predetermined rotational speed window, the inductance profile corresponding to one or more predetermined test current levels, the method comprising, for each test current level of the predetermined test current levels:
   changing a first direct current (DC) level of a first reference signal until determining that the PM machine is producing the test current level;

injecting respective first alternating current (AC) test signals onto the first reference signal and onto a second reference signal having a second DC level; and determining, in response to injecting the first AC test signals, a respective first self-saturation-induced inductance value and a respective first cross-saturation-induced inductance value for the PM machine, wherein the first and second reference signals comprise respective first and second stator flux reference signals generated using generated current reference signals and nominal inductance values for the PM machine, and wherein the predetermined rotational speed window is included within one of a 1000-1500 rotations per minute (rpm) window, a 300-500 rpm window, and a 30-50 rpm window.

11. The method of claim 10, further comprising, for each test current level of the predetermined current levels:

changing at least one of the first and second DC levels until determining that the PM machine is producing the current level;

injecting respective second AC test signals onto the first and second reference signals; and determining, in response to injecting the second AC test signals, a second self-saturation-induced inductance value and a second cross-saturation-induced inductance value for the PM machine.

12. The method of claim 11, further comprising, after determining the first self-saturation-induced inductance value and the first cross-saturation-induced inductance value:

removing the injected first AC test signals; and reducing the first DC level of the first reference signal to zero.

13. The method of claim 10, wherein determining the first self-saturation-induced inductance value and the first cross-saturation-induced inductance value comprises calculating, based on stator flux values provided by a voltage mode stator flux observer, respective responses to the injected AC test signals.

14. The method of claim 13, wherein the stator flux values are based on stator voltage command signals.

* * * * *